(12) United States Patent
Milschewski et al.

(10) Patent No.: US 10,859,697 B2
(45) Date of Patent: Dec. 8, 2020

(54) METHOD FOR DETECTING AN OBJECT IN A SURROUNDING REGION OF A MOTOR VEHICLE WITH THE AID OF AN ULTRASONIC SENSOR WITH IMPROVED FILTERING OF GROUND REFLECTIONS, CONTROL DEVICE, ULTRASONIC SENSOR APPARATUS AND MOTOR VEHICLE

(71) Applicant: VALEO Schalter und Sensoren GmbH, Bietigheim-Bissingen (DE)

(72) Inventors: Tino Milschewski, Bietigheim-Bissingen (DE); Jean-Francois Bariant, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 378 days.

(21) Appl. No.: 15/898,539

(22) Filed: Feb. 17, 2018

(65) Prior Publication Data

US 2018/0239017 A1 Aug. 23, 2018

(30) Foreign Application Priority Data

Feb. 17, 2017 (DE) .................. 10 2017 103 275

(51) Int. Cl.
*G01B 17/00* (2006.01)
*G01B 21/02* (2006.01)
(Continued)

(52) U.S. Cl.
CPC ............ *G01S 15/931* (2013.01); *G01S 7/527* (2013.01); *G01S 7/53* (2013.01); *G01S 15/10* (2013.01);
(Continued)

(58) Field of Classification Search
CPC .......... G01S 15/931; G01S 7/527; G01S 7/53; G01S 15/10; G01S 15/66; G01S 15/876; G06K 9/00805; G06K 9/6277
(Continued)

(56) References Cited

U.S. PATENT DOCUMENTS

2001/0033246 A1* 10/2001 Burchett ................. G01S 7/527
342/91
2015/0301157 A1* 10/2015 Ossowska ............... G01S 7/023
342/173
(Continued)

FOREIGN PATENT DOCUMENTS

DE 102010034263 A1 2/2012
DE 102010056439 A1 * 6/2012 ........... G01S 15/931
(Continued)

OTHER PUBLICATIONS

English Translation of DE102012018866, Feb. 2014.*
(Continued)

*Primary Examiner* — Michael P Nghiem
(74) *Attorney, Agent, or Firm* — Osha Bergman Watanabe & Burton LLP (57) ABSTRACT

A method for detecting an object in a surrounding region of a motor vehicle is disclosed. In each of a plurality of temporally sequential measurement cycles a raw signal is received, which describes an ultrasonic signal of an ultrasonic sensor reflected in the surrounding region, the raw signal is compared with a predetermined ground threshold value curve, and a signal component of the raw signal that is to be tracked which exceeds the ground threshold value curve is detected and assigned to the object, and the object is tracked in the measurement cycles on the basis of the detected signal component that is to be tracked, wherein to track the object after recognition of the signal component that is to be tracked, in the subsequent measurement cycles,
(Continued)

signal peaks of the raw signal are detected, and an assignment to the object is checked for the detected signal peaks.

13 Claims, 6 Drawing Sheets

(51) Int. Cl.

| | |
|---|---|
| *G01C 22/00* | (2006.01) |
| *G01S 15/931* | (2020.01) |
| *G01S 7/53* | (2006.01) |
| *G06K 9/00* | (2006.01) |
| *G01S 15/87* | (2006.01) |
| *G01S 15/10* | (2006.01) |
| *G01S 15/66* | (2006.01) |
| *G01S 7/527* | (2006.01) |
| *G06K 9/62* | (2006.01) |
| *G06K 9/32* | (2006.01) |

(52) U.S. Cl.
CPC ............ *G01S 15/66* (2013.01); *G01S 15/876* (2013.01); *G06K 9/00805* (2013.01); *G06K 9/6277* (2013.01); *G01S 7/5273* (2013.01); *G06K 2009/3291* (2013.01)

(58) Field of Classification Search
USPC ........................................................ 702/159
See application file for complete search history.

(56) References Cited

U.S. PATENT DOCUMENTS

| | | | | |
|---|---|---|---|---|
| 2015/0323668 A1* | 11/2015 | Heimberger | ............ | G01S 15/58 |
| | | | | 367/96 |
| 2016/0238700 A1* | 8/2016 | Matsuura | .............. | G01S 15/931 |

FOREIGN PATENT DOCUMENTS

| | | | | | |
|---|---|---|---|---|---|
| DE | 102012203091 | A1 * | 8/2013 | ........... | G01S 15/931 |
| DE | 102012016866 | A1 * | 2/2014 | ............ | G01S 15/42 |
| DE | 102015209878 | B3 | 2/2016 | | |
| DE | 102016100732 | A1 * | 7/2017 | ............ | G01S 7/527 |
| WO | WO-2017125366 | A1 * | 7/2017 | ............ | G01S 7/527 |

OTHER PUBLICATIONS

English Translation of DE102016100732, Jul. 2017.*
English Translation of DE102012203091, Aug. 2013.*
English Translation of DE102010056439, Jun. 2012.*

* cited by examiner

METHOD FOR DETECTING AN OBJECT IN A SURROUNDING REGION OF A MOTOR VEHICLE WITH THE AID OF AN ULTRASONIC SENSOR WITH IMPROVED FILTERING OF GROUND REFLECTIONS, CONTROL DEVICE, ULTRASONIC SENSOR APPARATUS AND MOTOR VEHICLE

BACKGROUND OF THE INVENTION

The present invention relates to a method for detecting an object in a surrounding region of a motor vehicle in which, in each of a plurality of temporally sequential measurement cycles a raw signal, which describes an ultrasonic signal of an ultrasonic sensor reflected in the surrounding region, is received, the raw signal is compared with a predetermined ground threshold value curve, and a signal component of the raw signal that is to be tracked which exceeds the ground threshold value curve is detected and assigned to the object, and the object is tracked in the measurement cycles on the basis of the detected signal component that is to be tracked. The present invention additionally relates to a control device and to an ultrasonic sensor apparatus for a motor vehicle. The present invention finally concerns a motor vehicle.

The interest is focused primarily on ultrasonic sensors for motor vehicles. Such ultrasonic sensors can, for example, be part of a driver assistance system of the motor vehicle. Objects in a surrounding region of the motor vehicle can be detected with the aid of the ultrasonic sensors. An ultrasonic signal can be transmitted with the ultrasonic sensor for this purpose. The ultrasonic signal reflected from the object can, additionally, be received again with the ultrasonic sensor. The distance from the object can be determined on the basis of the transit time between the transmission of the ultrasonic signal and the reception of the ultrasonic signal reflected from the object. A raw signal which describes the ultrasonic signal reflected in the surrounding region is moreover output by the ultrasonic sensor.

If measurements are carried out with the ultrasonic sensor, ground reflections, or reflections of the ultrasonic signal at the ground, are also received in addition to the reflections of the ultrasonic signal at the object. These ground reflections can be marked by different strengths depending on the type of the ground or of the surface. Stronger ground reflections usually result from a gravel road than from an asphalted roadway. In order to filter out these ground reflections it is provided that the evaluation of the raw signal entails comparison of the raw signal with a predetermined ground threshold value curve. Only those signal components of the raw signal that exceed this ground threshold value curve are here taken into account. It can here be the case that signal components that originate from the reflection of the ultrasonic signal at the object are also filtered out of the raw signal through the comparison with the ground threshold value curve. The reason for this can be that the object reflects the ultrasonic signal weakly. The received ultrasonic signal can, furthermore, exhibit variations, and thus at times be below the ground threshold value curve.

The use of so-called adaptive threshold value curves is known from the prior art for this purpose. An attempt is made here to adapt the ground threshold value curve, depending on the ground or on the surface in the surrounding region of the motor vehicle. DE 10 2010 034 263 A1, for example, describes a method for generating a threshold value curve for the evaluation of signals of an ultrasonic sensor. Grid points of the threshold value curve can here be specified variably depending on the curve of an interfering signal pattern.

DE 10 2015 209 878 B3 furthermore describes a method for detecting objects in the surroundings of a vehicle with at least one ultrasonic sensor. A threshold value is used here to mask out ground echoes, wherein ultrasonic echoes with an amplitude above the threshold value are classified as an echo of an object. It is, furthermore, provided that a tracking filter is used in order to filter out ground echoes that occur stochastically. It is provided here in particular that the tracking filter is used to filter out ground echoes on the basis of the distance and/or position relative to the movement of the motor vehicle. It can, furthermore, be provided that an optimum filter is employed in order to filter out Doppler-shifted ground echoes.

BRIEF SUMMARY OF THE INVENTION

It is the object of the present invention to indicate a solution as to how objects in a surrounding region of a motor vehicle can be reliably detected with the aid of an ultrasonic sensor.

This object is achieved according to the invention by a method, by a control device, by an ultrasonic sensor apparatus, and by a motor vehicle with the features according to the respective independent claims. Advantageous developments of the present invention are the objects of the dependent claims.

In one form of embodiment of a method for detecting an object in a surrounding region of a motor vehicle, in each of a plurality of temporally sequential measurement cycles a raw signal is preferably received, and describes in particular an ultrasonic signal of an ultrasonic sensor reflected in the surrounding region. The raw signal, what is more, is preferably compared with a predetermined ground threshold value curve, and a signal component of the raw signal that is to be tracked which exceeds the ground threshold value curve is preferably detected and assigned to the object. The object, furthermore, is tracked in the measurement cycles on the basis of the detected signal component that is to be tracked. In addition, to track the object after recognition of the signal component that is to be tracked, in the subsequent measurement cycles, signal peaks of the raw signal are preferably detected. An assignment to the object is, furthermore, checked, in particular for the detected signal peaks.

A method according to the invention serves for the detection of an object in a surrounding region of a motor vehicle. In each of a plurality of temporally sequential measurement cycles a raw signal is here received, which describes an ultrasonic signal of an ultrasonic sensor reflected in the surrounding region. The raw signal is further compared with a predetermined ground threshold value curve, and a signal component of the raw signal that is to be tracked which exceeds the ground threshold value curve is detected and assigned to the object. The object, furthermore, is tracked in the measurement cycles on the basis of the detected signal component that is to be tracked. To track the object after recognition of the signal component that is to be tracked, in the subsequent measurement cycles, signal peaks of the raw signal are detected here, and an assignment to the object is checked for the detected signal peaks.

At least one object in the surrounding region of the motor vehicle should be detected with the aid of the method. The method can, for example, be carried out with a control device or with a computing device of an ultrasonic sensor apparatus. The raw signal from the ultrasonic sensor can be received by means of the control device. To determine the raw signal, an ultrasonic signal is transmitted by the ultrasonic sensor, and the ultrasonic signal reflected in the surrounding region is again received. In particular, the ultrasonic signal reflected from the object in the surrounding region is received by the ultrasonic sensor. The ultrasonic sensor can comprise a membrane that can be excited into mechanical oscillations with a converter element, for example a piezoelectric element. The ultrasonic signal can be transmitted in this way. When the reflected ultrasonic signal again meets the membrane of the ultrasonic sensor, this is excited into mechanical oscillations. These mechanical oscillations can be detected with the converter element, and can be output in the form of the raw signal. The raw signal can, in particular, be output as an electrical voltage changeable over time. The raw signal can be the electrical voltage that is output directly by the converter element, i.e. the piezoelectric element. The electrical voltage of the converter element can, additionally, be amplified and/or filtered in order to generate the raw signal. The electrical voltage of the converter element, which may have been amplified and/or filtered, can further be correlated with the transmitted ultrasonic signal or with the signal with which the converter element was excited in order to transmit the ultrasonic signal. This raw signal can then be appropriately evaluated with the control device.

Temporally sequential measurement cycles are carried out in order to be able to continuously detect, or track, the object in the surrounding region. The raw signal is received in each measurement cycle. The raw signal is, moreover, compared with the ground threshold value curve. Through the comparison of the raw signal with the ground threshold value curve, ground reflections, or reflections of the ultrasonic signal at the ground, should be filtered out. Only those signal components of the raw signal that lie above this ground threshold value curve are taken into account for this purpose. This signal component, which is above the ground threshold value curve, should be tracked. The signal component that is to be tracked is, in particular, a signal peak. The amplitude of this signal peak is, however, high enough that it exceeds the ground threshold value curve. The signal component of the raw signal that is to be tracked and which exceeds this ground threshold value curve, is here recognized as originating from the object. It is also quite possible to provide that a plurality of objects are detected in the surrounding region. In this case, a plurality of signal components above the ground threshold value curve that are to be tracked are then detected.

It is now provided according to an important aspect of the present invention, that the tracking of the object is carried out after the recognition of the signal component that is to be tracked on the basis of the raw signal. After the signal component that is to be tracked and which exceeds the ground threshold value curve has been detected, the object can be tracked in the subsequent measurement cycles. In this case, however, not only those signal components of the raw signal that exceed the ground threshold value curve are taken into account, but signal peaks in the raw signal are detected, and in each measurement cycle a check is made as to whether these signal peaks can be assigned to the signal component or to the object that is to be tracked.

Thus in this case the history of the tracked object is taken into account. Since the detected signal component that is to be tracked has already exceeded the ground threshold value curve at least once, it is assumed that this signal component originates from the object and is to be tracked. It is thus also assumed that this object can be present in the surrounding region. Possible signal peaks, which can be assigned to this signal component to be tracked, are now looked for within the raw signal on the basis of these recognitions. In particular, all the detected signal peaks can be examined to see whether they can be assigned to the object. Allowance is made here for the fact that the reflections of the ultrasonic signal from the object can be subject to variations, and that it can therefore be the case that the signal peaks lie below the ground threshold value curve. Furthermore, the amplitude of the signal peaks can change depending on the distance of the object. The detection of the object can be carried out more reliably in that the tracking of the object is carried out after the object has once been recognized in the raw signal.

Preferably, in order to the recognize the signal peaks, regions of the raw signal that exceed a predetermined noise threshold value curve and which exhibit a predetermined rise are determined independently of the predetermined ground threshold value curve. In order to recognize the signal peaks in the raw signal, the raw signal can first be compared with the predetermined noise threshold value curve. The noise components of the raw signal can be filtered out in this way. These noise components are caused, for example, by noise in the electronics of the ultrasonic sensor. The components of the raw signal that exceed this noise threshold value curve are then checked for signal peaks. The signal peaks are characterized in that they exhibit a predetermined rise, or a rise that takes place within a predetermined period of time. In the region of the signal peaks, the amplitude of the raw signal is greater than in the other regions. These signal peaks can perfectly well originate from reflections of the ultrasonic signal at the object or at the ground. As already explained, the signal peaks are considered independently of the ground threshold value curve, since it is assumed that the signal component to be tracked, or the signal peak that is assigned to the object, on some occasions, or in a few of the measurement cycles, can fall below the ground threshold value curve. In general this permits a reliable recognition of the object.

In one form of embodiment, for each of the signal peaks a first probability is determined that the signal peak describes the reflection of the ultrasonic signal at the object, and a second probability is determined that the signal peak describes an interfering signal, and the assignment of the signal peak to the object that is to be tracked is carried out with reference to the first probability and to the second probability. In other words, it is possible, on the one hand, to determine for each peak of the raw signal how probable it is that it describes an echo from the object. In addition, it is determined how probable it is that this peak does not originate from the object, but that it describes an interfering signal. This interfering signal can, for example, be caused by a ground reflection, interference and/or noise. This altogether permits a reliable assignment of the peaks in the raw signal to the tracked object.

It is in particular provided here that a filter for probabilistic data assignment is used; this can, for example, be referred to as a Probabilistic Data Association Filter (PDAF). The PDAF is designed to track an object or track in a surroundings with interfering signals on the basis of the Kalman filter. A track is initialized as soon as the object has been recognized with reference to the signal component to be tracked which exceeds the ground threshold value curve. In the PDAF, all the returning measurements or signal peaks that could originate from the object are taken into account, instead of only choosing one measurement from amongst them. A determination as to whether the measurements are valid is, furthermore, made. In addition to this, all the validated measurements are assigned to the first probability and/or the second probability, with different weightings. The validated measurements are, furthermore, combined with different weightings based on the location, and the combined measurement is then used in order to update the state estimation of the object. The first probability and the second probability can thus be determined in a simple and reliable manner with the aid of the PDAF.

It is furthermore advantageous if a movement model that describes the movement of the object relative to the motor vehicle is determined, and the first probability is determined depending on the movement model. The movement of the object relative to the motor vehicle can be determined or predicted with the help of the movement model. It is now possible, on the basis of the movement model, to determine how the object changes its position relative to the motor vehicle during the measurement cycles. It is possible in particular to determine how the distance of the object from the motor vehicle changes. A region in the raw signal that corresponds to the transit time for this distance can then be selected with reference to the predicted distance. The first probability can be higher in this region, since it is more probable that signal components that are to be tracked from the object are to be found in this time range.

In a further form of embodiment, the respective amplitudes of the signal peaks are determined, and the first probability and/or the second probability are determined depending on the respective amplitude. Since the probability that a peak truly originates from an object rises with the amplitude of the peak, it is preferably provided that the information relating to the amplitude of the respective signal peaks is taken into account when determining the first probability and/or the second probability. A PDAF which also takes amplitude information into account can, for example, be used for this purpose. This is also referred to as a PDAFAI (Probabilistic Data Association Filter with Amplitude Information).

It is furthermore advantageous if the first probability is determined with reference to at least one predetermined probability density function for amplitudes of raw signals that describe reflections of ultrasonic signals at objects. In order to be able to determine the first probability reliably, it is necessary to be aware of reflections from different objects. In principle it should be possible with the help of the measurements with the ultrasonic sensor to recognize all types of objects in the surrounding region of the motor vehicle. The objects differ from one another in that they reflect the ultrasonic signal in different ways. Appropriate reference measurements with different reference objects are preferably carried out for this purpose, in order to determine the probability density functions for the amplitudes. It is possible here to take into account the fact that a wall usually reflects the ultrasonic signal most strongly. The reflection of the ultrasonic signal that originates from a wall can thus be viewed as the maximum amplitude. An even distribution of the probability density function can then be assumed between an amplitude of zero and this maximum amplitude. In this way the first probability can be determined taking into account possible objects that may be present in the surrounding region.

In a further form of embodiment, the second probability is determined with reference to at least one predetermined probability density function for amplitudes of raw signals that describe reflections of ultrasonic signals at a ground in the surrounding region. These probability density functions for the amplitudes of the raw signal can also be determined in reference measurements carried out previously. It is necessary to ensure when taking the reference measurements that no object is located in the surrounding region, so that the reference measurements on the basis of which the probability density functions are determined only describe the ground reflections. When taking the reference measurements, the amplitude can be divided into predetermined amplitude ranges. The proportions of the raw signals that lie in these amplitude ranges can then be determined for each of the amplitude ranges. The probability density can then be determined from this depending on the amplitude. The second probability, which describes the probability that the signal peak originates from a ground reflection of the ultrasonic signal, can then be determined on the basis of these probability density functions.

It is furthermore advantageous if, for predetermined distances, the at least one probability density function is predetermined in each case, for each of the signal peaks a distance assigned to the signal peak is determined, and the second probability for the respective signal peak is determined with reference to the probability density function for its distance. For different distances, or distance ranges, at least one probability density function can be determined in each case. A distance can be assigned on the basis of the transit time to the peak in the raw signal for which the second probability is to be determined. The appropriate probability density function can then be selected for this distance, in order to determine the second probability. The fact that hardly any ground reflections occur at relatively small distances and at relatively large distances is taken into account here. In this case, the raw signal can, for example, only contain noise components. The ground reflections usually occur at a medium distance range. This medium distance range can have a distance in a range between 0.5 m and 2 m, in particular between 1 m and 1.5 m from the motor vehicle. This information can thus be used in order to be able to determine the second probability precisely.

It is furthermore advantageous if, for different types of ground, the at least one probability density function is predetermined in each case, and the second probability is determined depending on the type of the ground in the surrounding region. Reference measurements can be carried out on different grounds or surfaces for the determination of the probability density functions. It is in particular provided that, for example, probability density functions for an asphalted roadway and probability density functions for a gravel road are specified. The knowledge that the intensity of the interfering signals from asphalt and from gravel differ significantly from one another is taken into account in this way. In particular, the interfering signals occur with a higher intensity or amplitude in the case of gravel. The appropriate probability density function for determination of the second probability can in this way be selected depending on the current surface that is present in the region surrounding the motor vehicle.

In a further form of embodiment, the type of ground in the surrounding region is determined in each measurement cycle on the basis of an assignment of the raw signal received to one of the predetermined probability density functions. An assignment of the raw signal to one of the predetermined probability density functions can be carried out on the basis of the distribution of the signal amplitudes of the raw signal. The distance can, here, in particular, also be taken into account. It is thus possible to check in each measurement cycle whether a gravel road and an asphalted road are located in the surroundings of the motor vehicle. Depending on the ground or on the surface on which the motor vehicle is currently located, different probability density functions are used for the determination of the second probability. In particular, different probability density functions are taken as a basis for asphalt and for gravel. This permits a reliable tracking of the object.

A check is made in a further embodiment as to whether one of the signal peaks originates from a second echo of the ultrasonic signal reflected by the object, and if the signal peak describes the second echo, the signal peak is tracked as a second echo. If the ultrasonic signal is transmitted, further echoes can also be received in addition to the first echo. The first echo describes the direct reflection of the ultrasonic signal at the object. A second echo is often also received. The second echo can arise in that the ultrasonic signal is first reflected from the object, and then from the ground. It can also be the case that the second echo originates from a different part of the object to the first echo. In order to avoid interferences between the first and the second echo within the filter, it is provided that the first echo is assigned to the object. The second echo can be tracked separately after the first echo. It is possible in this way for example to prevent the PDAF from assigning the signal component that originates from the second echo to the object. It can be provided as an alternative to this that the second echo is tracked as a separate object. A JPDAF (Joint Probabilistic Data Association Filter) can be used for this purpose. Further echoes of the ultrasonic signal that originate from the object can also in principle, be tracked in this way.

In one form of embodiment, the signal peak is recognized as originating from the second echo if a distance that describes the signal peak has a predetermined spacing from a distance of the object. On the basis of the transit time of the signal peak that describes the second echo, the distance which is assigned to the second echo can then be determined. The distance of the object can be determined with reference to the transit time of the signal component to be tracked that is assigned to the object. Measurements have shown here that the second echo usually occurs at a spacing of about 40 cm from the first echo. This spacing depends on the position where the ultrasonic sensor is installed at the motor vehicle. In addition, the second echo can occur at this spacing from the object in the successive measurement cycles. To recognize the second echo, the fact that this occurs with a predetermined probability of detection can furthermore be taken into account. A second echo that originates from the tracked object can thus be recognized in a reliable manner.

It is also possible to provide that an object is no longer tracked, since it is no longer present in the surrounding region. This can, for example, be recognized in that no signal component can be assigned to the object. It can also be the case that a new object is recognized and tracked. In principle it is also possible for a plurality of objects to be tracked simultaneously.

A control device according to the invention for a motor vehicle is designed to carry out a method according to the invention and the advantageous embodiments thereof. The control device can be an electronic control device (ECU—Electronic Control Unit) of the motor vehicle. The control device can also be provided by a computer device, a microprocessor, a digital signal processor or the like. The control device can be formed separately from the ultrasonic sensor. It can also be provided that the control device is a part of the ultrasonic sensor. A computer program can, further, be provided, which is for example stored on a memory medium, wherein the computer program is programmed to execute the method described here when it is executed on the control device or on a computer device of the control device.

An ultrasonic sensor apparatus according to the invention for a motor vehicle comprises a control device according to the invention. The ultrasonic sensor apparatus additionally comprises at least one ultrasonic sensor. It is preferable to provide here that the ultrasonic sensor apparatus comprises a plurality of ultrasonic sensors. These can be arranged distributed in any desired manner at the motor vehicle. The ultrasonic sensors can be connected for data transmission via a suitable data line to the control device. The signals that are made available by the ultrasonic sensors can be transmitted in this way to the control device. One or more objects can then be recognized in the surrounding region on the basis of the raw signals. It can also be provided that a digital surroundings map that describes the surroundings of the motor vehicle is provided by means of the control device.

A motor vehicle according to the invention comprises an ultrasonic sensor apparatus according to the invention. The ultrasonic sensor apparatus can, for example, be part of a driver assistance system of the motor vehicle. Such a driver assistance system is, in particular, designed as a parking assistance system whose purpose is to support a driver of the motor vehicle when placing the motor vehicle in and/or leaving a parking space. Alternatively to this, the driver assistance system can be designed as an emergency braking assistant, a lane changing assistant and/or a lane departure assistant. The driver assistance system can, furthermore, be used to detect objects in a slewing range of a door of the motor vehicle. The motor vehicle is, in particular, designed as a passenger car. It can also be provided that the motor vehicle is designed as a commercial vehicle.

The preferred embodiments presented with reference to the method according to the invention and their advantages apply correspondingly to the control device according to the invention, to the ultrasonic sensor apparatus according to the invention, and to the motor vehicle according to the invention.

Further features of the invention emerge from the claims, the figures and the description of the figures. The features and feature combinations referred to in the description above, as well as the features and feature combinations referred to below in the description of the figures and/or only illustrated in the figures, can not only be used in the respectively indicated combination, but also in other combinations without leaving the scope of the invention. Embodiments of the invention that are not explicitly shown and explained in the figures, but which emerge and can be generated from separate combinations of features from the embodiments that are explained, are thus also to be deemed as comprised and disclosed. Embodiments and combinations of features which thus do not exhibit all the features of an originally formulated independent claim are also to be deemed to be disclosed. Embodiments and feature combinations, in particular of the embodiments disclosed above, which go beyond or deviate from the feature combinations disclosed in the back-references of the claims are, in addition, to be deemed as disclosed.

BRIEF DESCRIPTION OF DRAWINGS

The invention is now explained in more detail with reference to preferred exemplary embodiments, and also with reference to the appended drawings.

Here.

DETAILED DESCRIPTION OF THE INVENTION

The same reference codes are given in the figures to identify elements that are identical and have the same functions.

Figure 1:
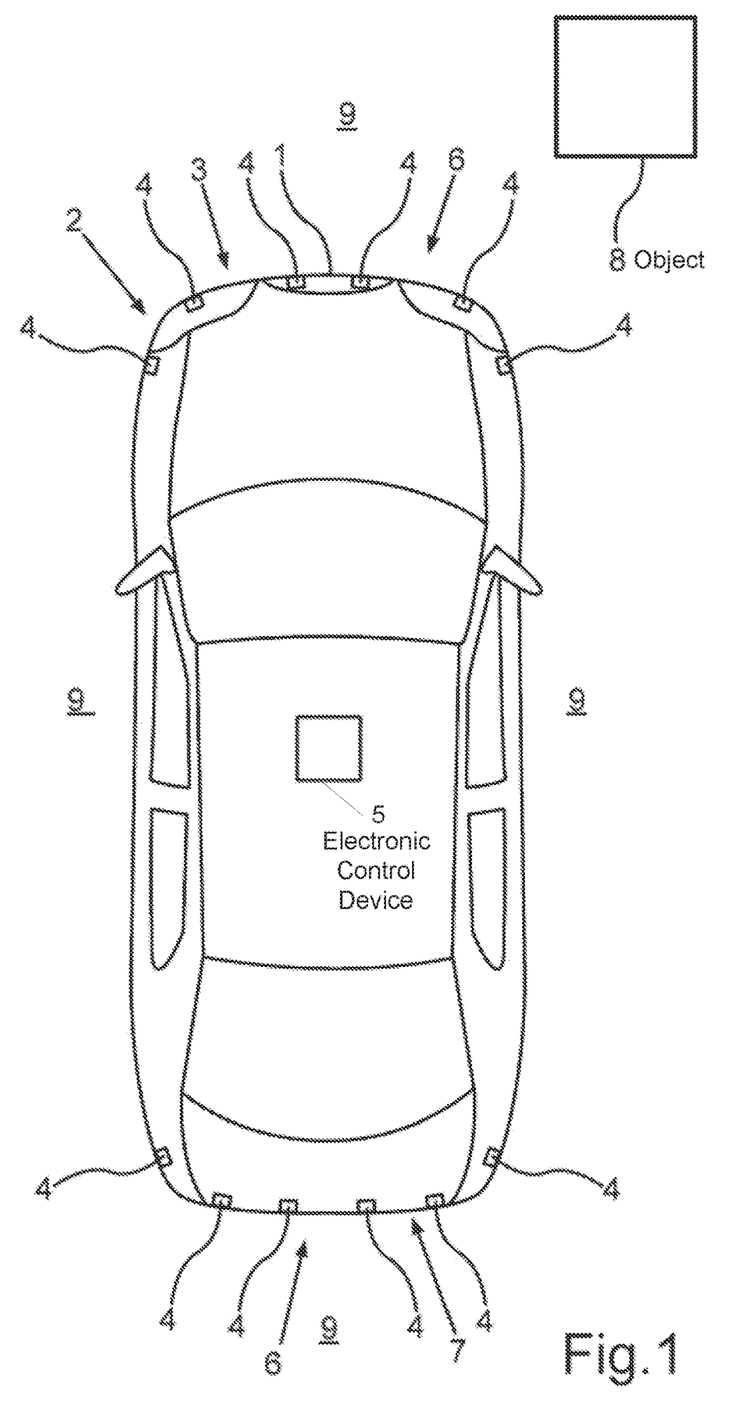
FIG. 1 shows a motor vehicle according to one form of embodiment of the present invention which comprises an ultrasonic sensor apparatus with a plurality of ultrasonic sensors.

FIG. 1 shows a view from above of a motor vehicle 1 according to one embodiment of the present invention. The motor vehicle 1 is in the present case designed as a passenger car. The motor vehicle 1 comprises a driver assistance system 2 whose purpose is to support a driver when driving the motor vehicle 1. The driver assistance system 2 can, in particular, be designed as a parking assistance system by means of which the driver can be assisted when parking the motor vehicle 1 into a parking space and/or when driving out of the parking space.

The driver assistance system 2 in turn comprises an ultrasonic sensor apparatus 3. The ultrasonic sensor apparatus 3 comprises at least one ultrasonic sensor 4. In the present exemplary embodiment, the ultrasonic sensor apparatus 3 comprises twelve ultrasonic sensors 4. Six ultrasonic sensors 4 are here arranged in a front region 6 of the motor vehicle 1, and six ultrasonic sensors 4 are arranged in a rear region 7 of the motor vehicle 1. The ultrasonic sensors 4 can, in particular, be mounted on the bumper of the motor vehicle 1. The ultrasonic sensors 4 can here, at least in certain regions, be arranged in appropriate recesses or openings in the bumper. It can also be provided that the ultrasonic sensors 4 are arranged hidden behind the bumper. In principle, the ultrasonic sensors 4 can also be arranged at other cladding parts of the motor vehicle 1. The ultrasonic sensors 4 can, for example, also be arranged at or hidden behind the doors of the motor vehicle 1.

Raw signals 10 which describe at least one object 8 in a surrounding region 9 of the motor vehicle 1 can be made available with the aid of the respective ultrasonic sensors 4. An object 8 is illustrated in the present case in the surrounding region 9. An ultrasonic signal can be transmitted by any of the ultrasonic sensors 4 to determine the raw signal 10. After this, the ultrasonic signal reflected by the object 8 can again be received. A distance between the ultrasonic sensor 4 and the object 8 can then be determined on the basis of the transit time between the transmission of the ultrasonic signal and the reception of the ultrasonic signal reflected from the object 8. It can also be provided that the respective distances that are determined with different ultrasonic sensors 4 are taken into account. The relative distance between the motor vehicle 1 and the object 8 can thus be determined by means of trilateration. It can further be provided that the ultrasonic signal that was transmitted from one of the ultrasonic sensors 4 is received by a neighbouring ultrasonic sensor 4. This is also referred to as cross-measurement.

The ultrasonic sensor apparatus 3 furthermore comprises an electronic control device 5 which is connected to the ultrasonic sensors 4 via a data line for data transmission. For the sake of clarity, the data line is not shown in the present case. The raw signals 10 determined with the respective ultrasonic sensors 4 can be transmitted over the data line to the control device 5. It can also be provided that the raw signal 10 is first processed within the respective ultrasonic sensor 4. The control device 5 can check with reference to the raw signals 10 whether the object 8 is located in the surrounding region 9, and at what position the object 8 is located in the surrounding region 9. This information can then be used by the driver assistance system 2 to give an output to the driver of the motor vehicle 1. It can furthermore be provided that the driver assistance system 2 manipulates a steering system, a braking system and/or a drive motor in order to manoeuvre the motor vehicle 1 at least semi-autonomously, depending on the at least one detected object 8.

Figure 2:
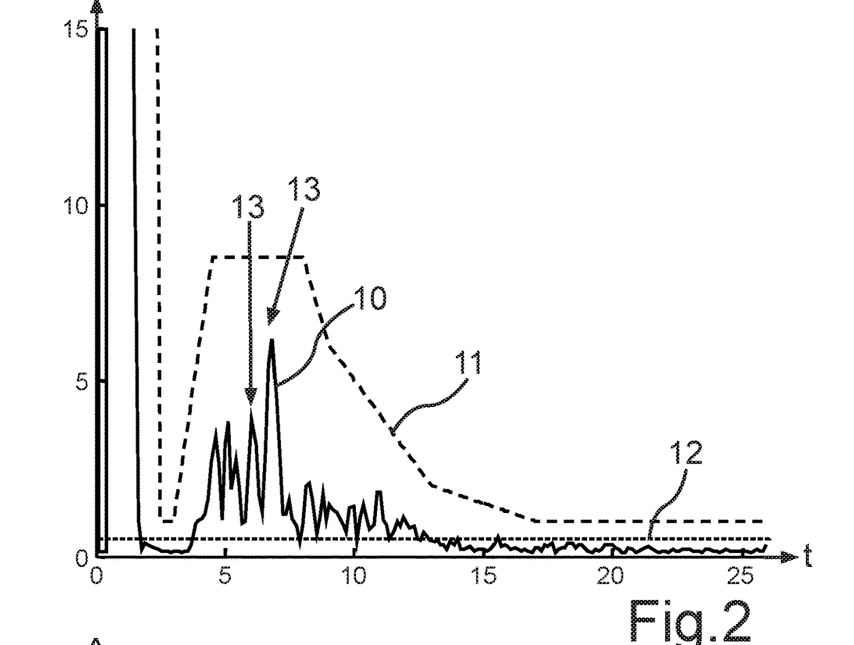
FIG. 2 shows a raw signal of an ultrasonic sensor against time, wherein the raw signal describes reflections of the ultrasonic signal from a gravel road, and wherein the amplitude of the ultrasonic signal lies below a ground threshold value curve.

FIG. 2 shows a curve against time of a raw signal 10 which is provided by one of the ultrasonic sensors 4. The transit time tin ms is shown in the present case on the abscissa, and the amplitude A is plotted on the ordinate. The raw signal 10 is compared with a ground threshold value curve 11 to evaluate the raw signal 10 by means of the control device 5. In the present case the raw signal 10 describes a reflection of the ultrasonic signal at a gravel road, where otherwise no object 8 is located in the surrounding region 9 of the motor vehicle 1 or of the ultrasonic sensor 4. The ground threshold value curve 11 is determined such that the proportions of the raw signal 11 that originate from the ground reflections does not exceed the ground threshold value curve 11. A noise threshold value curve 12 is additionally provided, whose purpose is to filter out noise components from the raw signal 10. The raw signal 10 has a plurality of signal peaks 13 which do not, however, exceed the ground threshold value curve 11. These signal peaks 13, which originate from the reflections of the ultrasonic signal on the gravel road, have a random distribution.

Figure 3:
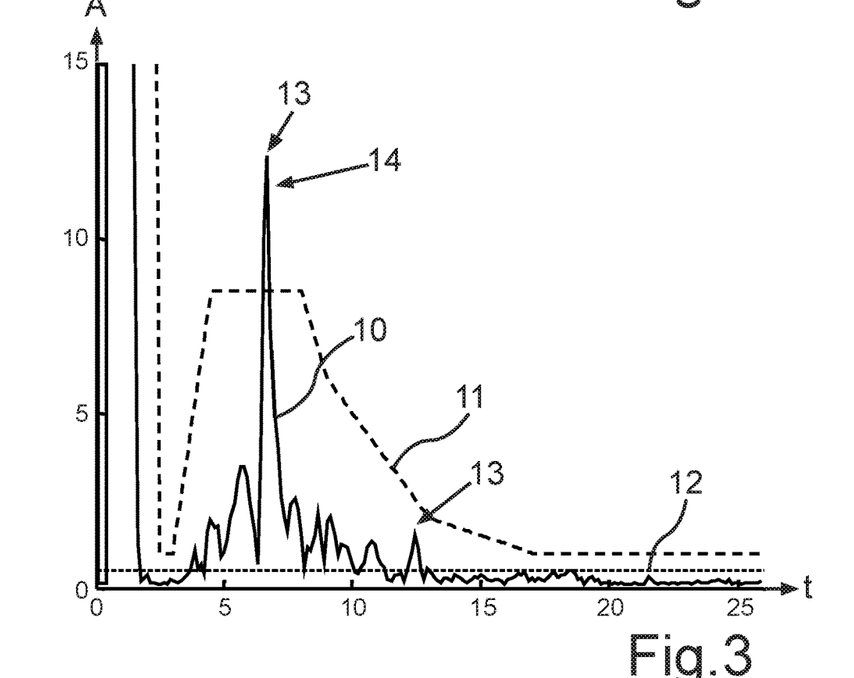
FIG. 3 shows a raw signal which describes the reflection of the ultrasonic signal at a post, wherein a signal component to be tracked of the raw signal, which is assigned to the post, exceeds the ground threshold value curve.

In comparison with this, FIG. 3 shows a raw signal 10 of the ultrasonic sensor 4 which describes a reflection of the ultrasonic signal at a post with a diameter of 75 mm. A signal peak 13 of the raw signal 10 which exceeds the ground threshold value curve 11 can be recognized here. This signal peak 13 describes a signal component 14 to be tracked, which is assigned to the object 8 or to the post. In addition, the raw signal 11 has further signal peaks 13, but only the signal peak 13 that describes the signal component 14 to be tracked exceeds the ground threshold value curve 11. Since the signal component 14 to be tracked clearly exceeds the ground threshold value curve 11, it can be assigned to the object 8 or to the post.

Figure 4:
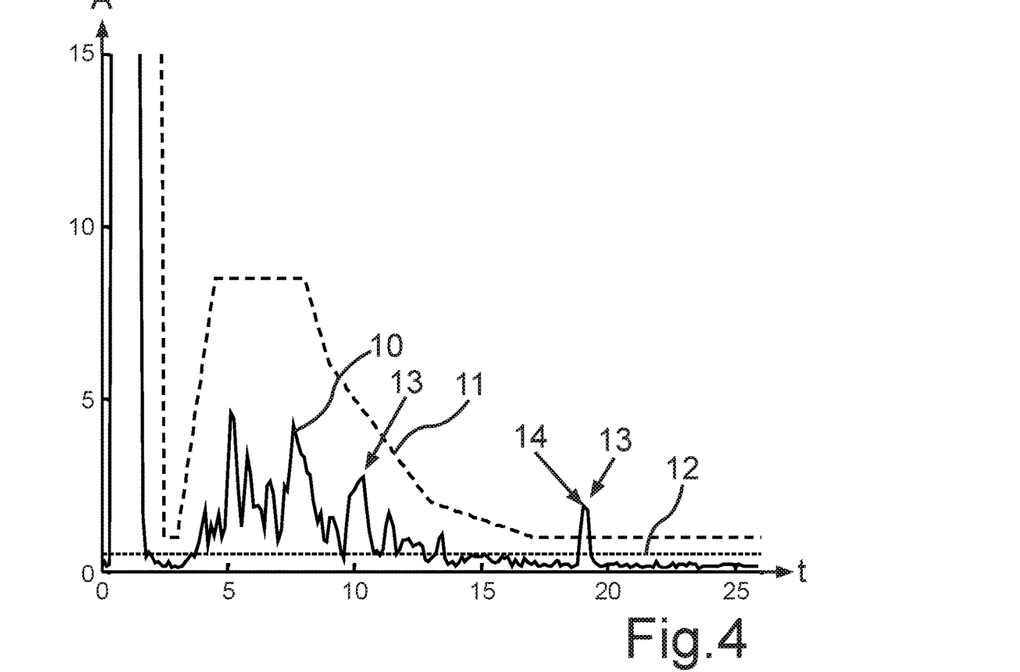
FIG. 4 shows a raw signal which describes the reflection of the ultrasonic signal at a garbage bin, wherein the garbage bin is located at a first clearance from the motor vehicle.
Figure 5:
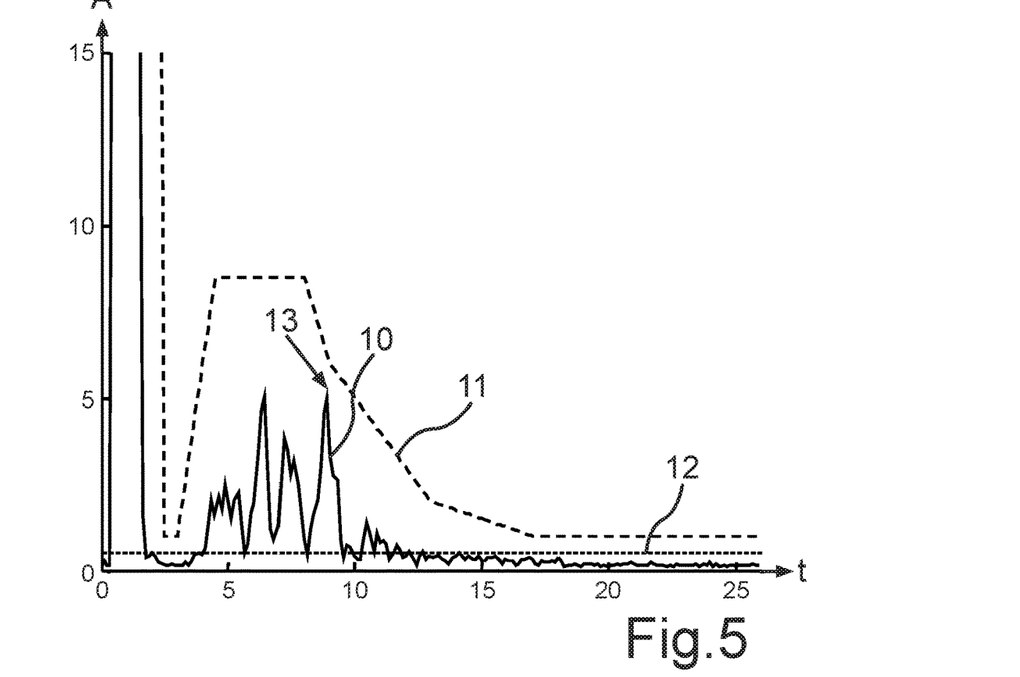
FIG. 5 shows a raw signal which describes the reflection of the ultrasonic signal at the garbage bin, wherein the garbage bin is located at a smaller second clearance in comparison to the first clearance.

FIG. 4 shows a further curve against time of a raw signal 10 in which the raw signal 10 has a plurality of signal peaks 13. The signal peak 13 on the right-hand side originates from the reflection of the ultrasonic signal at a small garbage bin. This signal peak 13 corresponds to the signal component 14 to be tracked. The signal peak 13 which originates from the object 8 or from the garbage bin, exceeds the ground threshold value curve 11 here, since the ground threshold value curve 11 for this transit time, or for this distance range, exhibits a relatively small amplitude. A further signal peak 13 on the left-hand side originates from the reflection of the ultrasonic signal at the ground. This signal peak 13 does not exceed the ground threshold value curve 11. In comparison with this, FIG. 5 shows a further raw signal 10 that describes reflections of the ultrasonic signal of the garbage bin, and where, in comparison with the measurement of FIG. 4, the garbage bin is located closer to the ultrasonic sensor 4. The signal peak 13 which originates from the garbage bin here does not exceed the ground threshold value curve 11. The reason for this is that the ground threshold value curve 11 for this distance range exhibits a relatively high amplitude. In addition, the amplitude is low, since the garbage bin reflects the ultrasonic signal only weakly. On the basis of the comparison between the raw signal 10 and the ground threshold value curve 11, the signal component 14 to be tracked, which originates from the garbage bin, thus cannot be recognized.

Figure 6:
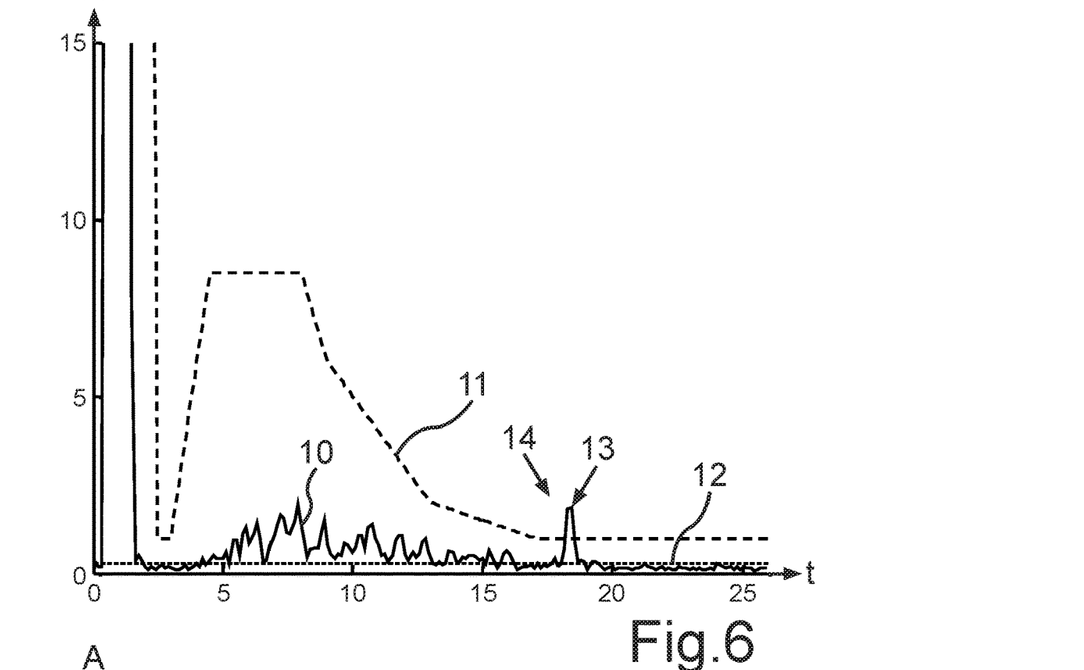
FIG. 6 shows a raw signal, wherein a signal peak of the raw signal that originates from the reflection of the ultrasonic signal at a post exceeds the ground threshold value curve.
Figure 7:
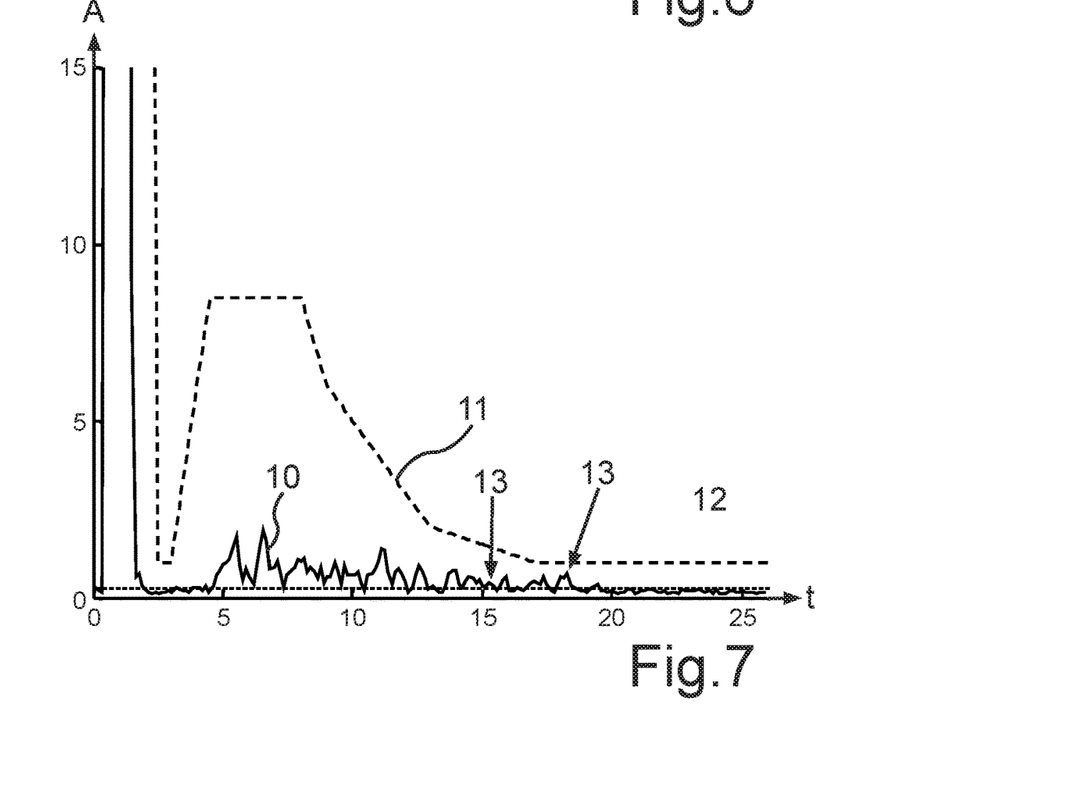
FIG. 7 shows a raw signal, wherein a signal peak of the raw signal that originates from the reflection of the ultrasonic signal at the post is below the ground threshold value curve.

FIG. 6 shows a further raw signal 10 plotted against time t. In this case, a signal component 14 to be tracked, or a signal peak 13 that exceeds the ground threshold value curve 11, can be recognized. This signal component 14 to be tracked originates from the post described previously. In comparison with this, FIG. 7 shows the raw signal 10 at a different point in time or from a different measurement cycle with the ultrasonic sensor 4. Due to the variations in the echo signal, the signal peak 13, which originates from the object 8, is here below the ground threshold value curve 11. As a result it cannot be distinguished from a further signal peak 13, shown just to the left of it, which originates from ground reflections.

It is thus clear that the recognition of the object 8, or the tracking of the object 8, cannot take place reliably purely on the basis of the comparison of the raw signal 10 with the ground threshold value curve 11. In the present case it is provided that a check is first made as to whether a signal component 14 to be tracked that exceeds the ground threshold value curve 11 is recognized. This signal component 14 to be tracked is then assigned to the object 8. For the further tracking of this object 8 in the subsequent measurement cycles, the raw signal 10 is then employed, independently of the ground threshold value curve 11. In each measurement cycle, the signal peaks 13 in the raw signal 10 can then be determined, and it is possible to check whether these signal peaks 13 can be assigned to the signal component 14 to be tracked or to the object 8.

A so-called Probabilistic Data Association Filter (PDAF) is used in the present case for the assignment of the signal peaks 13 to the object 8. The basic idea behind the PDAF is to view the set of all possible associations as a partition of the universe, and to apply the theory of total probability in order to distribute the probability density function of a state as the weighted sum of the probability density functions of the state conditioned for each possible assignment. Each of these conditioned probability density functions can be estimated with the aid of a Kalman filter. A mixed distribution of probability density functions results from this, wherein, as a simplification which is used by the PDAF to reduce the number of the components of the sum, only the expectation and the covariance of this mixed distribution are tracked.

A state x can here be defined for the tracked object 8. A set $A=\{A_i\}$ of all possible assignments can, furthermore, be defined which also contains the possibility $A_0$ that no measurement is correct, i.e. that only interfering signals (clutter) are present. These interfering signals can originate from ground reflections of the ultrasonic signal and/or from noise. The mixed distribution can then be determined on the basis of the theorem of total probability:

$$P(x/Z) = \sum_i P(x/Z, A_i)P(A_i/Z) = \sum_i P(x/Z, A_i)\beta_i \quad (1)$$

$$\sum_i \beta_i = 1$$

In particular here, the state $x_i$ conditioned to $A_i$ can be considered, where the measurement originates from the object 8 and the other measurements are interfering data. The expectation and the covariance of this probability density function can be determined from this:

$$\hat{x}^M = \sum_i \hat{x}_i \beta_i \quad (2)$$

$$P^M = \sum_i P_i \beta_i + \sum_i (\hat{x}_i - \hat{x}^M)(\hat{x}_i - \hat{x}^M)^T \beta_i$$

$$P_i = E[(x-\hat{x}_i)(x-\hat{x}_i)^T/Z, A_i]$$

A measurement model can here also be defined:

$$y = Hx + q, \quad (3)$$

where q describes a non-correlated noise having a mean value of zero and a known covariance Q. A number of assignments can, further, be made for a set $Z=\{z_i\}_{i=1}^m$ of measurements m within an assignment window V. Taking a Kalman amplification K into account, this yields:

$$x_i = x + Kv_i$$

$$v_i = Hx - z_i \quad (4)$$

The expectation and the covariance from equation (2) can then be expressed as follows:

$$\hat{x}^M = \hat{x} + K\hat{v} \quad (5)$$

$$\hat{v} = \sum_{i=1}^m \beta_i \hat{v}_i$$

-continued $$P^M = \beta_0 P + (1-\beta_0)P_n + \tilde{P} \quad (6)$$

$$\tilde{P} = K\left(\sum_{i=1}^{m} \beta_i \hat{v}_i \hat{v}_i^T - \hat{v}\hat{v}^T\right)K^T$$

The detection probability $P_D$ and the probability $P_G$ for exceeding a gate are, furthermore, defined. Making the assumption of a diffuse distribution of the interfering signals, the weightings for the mixed distribution can be calculated as follows:

$$i \neq 0, \beta_i = \frac{e_i}{b + \sum_{i=1}^{m} e_i} \quad (7)$$

$$\beta_0 = \frac{b}{b + \sum_{i=1}^{m} e_i} \quad (8)$$

$$b = m\frac{1 - P_D P_G}{V P_D P_G} \quad (9)$$

$$e_i = P(z_i/A_i, m) \quad (10)$$

In addition, amplitude information $a_i$ can be added to the position measurement $y_i$.

$$z_i = \begin{bmatrix} y_i \\ a_i \end{bmatrix} \quad (11)$$

Here, a first probability $P_1^\tau(a_i)$ describes how probable it is that the measurement with the amplitude $a_i$, which exceeds the threshold value $\tau$, is a correct measurement, and a second probability $P_0^\tau(a_j)$ describes how probable it is that the measurement with the amplitude $a_j$, which exceeds the threshold value $\tau$, is interfering data. A PDAF which takes additional information related to the amplitude into account is thus used to track the object 8. Such a filter can also be referred to as a PDAFAI. A PDAFAI with the weightings) $\beta_i$ can then be determined from this:

$$i \neq 0, \beta_i = \frac{\gamma_i e_i}{b + \sum_{i=1}^{m} \gamma_i e_i} \quad (12)$$

$$\beta_0 = \frac{b}{b + \sum_{i=1}^{m} \gamma_i e_i} \quad (13)$$

$$\gamma_i = \frac{P_1^\tau(a_i)}{P_0^\tau(a_i)} \quad (14)$$

The PDAFAI can be used to track echoes from the ultrasonic sensor 4. The state $x=[d, v]^T$ is defined for this purpose, wherein d is the distance from the object 8, and v describes the speed relative to the object 8. The state then follows the standard movement model:

$$x_{k+1} = Fx_k + u \quad (15)$$

$$F = \begin{bmatrix} 1 & \Delta t \\ 0 & 1 \end{bmatrix}$$

-continued $$\hat{u} = 0 \quad (16)$$

$$E[uu^T] = \begin{bmatrix} \frac{\Delta t^4}{4} & \frac{\Delta t^3}{2} \\ \frac{\Delta t^3}{2} & \Delta t^2 \end{bmatrix} U$$

Here, U is the variance of the noisy acceleration, and $\Delta t$ is the time between two steps. Taking into account the fact that Q is the variance of the noise of the measured distance, the measurement model can be determined as follows:

$$y = Hx + q \quad (17)$$
$$H = [1 \ 0]$$

$$\hat{q} = 0 \quad (18)$$
$$E[qq^T] = Q$$

Allowance is also made for the fact that the distribution of the interfering signals changes depending on the distance. The ultrasonic sensor 4 scarcely receives any reflections of the ultrasonic signal from the ground at relatively small distances and at relatively large distances. The interfering signals here result from the noise of the electronics of the ultrasonic sensor 4. At a medium distance range, which can have a distance of about 1 m from the ultrasonic sensor 4, the interfering signals are caused by the reflections of the ultrasonic signal from the ground. In the same way the amplitude of the raw signal will fall, depending on the distance. It is therefore provided that $P_1^\tau(a_i/y_i)$ and $P_0^\tau(a_j/y_j)$ are defined, and not $P_1^\tau(a_i)$ and $P_0^\tau(a_j)$. The common distributions $P(y_i,a_i/A_i,a_i>\tau)=P(a_i/y_i,A_i,a_i>\tau)P(y_i/A_i)=P_1^\tau(a_i/y_i)P(y_i/A_i)$ should also be determined, and $P(y_j,a_j/A_i, a_j>\tau)=P(a_j/y_j,A_i,a_j>\tau)P(y_j/A_i)=P_0^\tau(a_j/y_j)P(y_j/A_i)$ in the same way.

The first probability $P_1^\tau(a_i/y_i)$ and the second probability $P_0^\tau(a_j/y_j)$ can be calculated if the probability density functions of the amplitudes, conditioned for the distance, are known:

$$P_1^\tau(a_i/y_i) = \frac{P_1(a_i/y_i)}{\int_\tau^{+\infty} P_1(a/y_i)da} \quad (19)$$

$$P_0^\tau(a_i/y_i) = \frac{P_0(a_i/y_i)}{\int_\tau^{+\infty} P_0(a/y_i)da} \quad (20)$$

A very simple, weak model is used for the reflection of the ultrasonic signal from an object 8. In the present case, all types of objects 8 should be covered with the help of the filter. This applies both to objects 8 that reflect the ultrasonic signal very strongly, through to objects 8 that only reflect the ultrasonic signal very weakly. It is not possible here to define the object 8 that reflects the ultrasonic signal most weakly. An object 8 that reflects the ultrasonic signal most strongly, however, is known, namely a wall. For that reason, a maximum amplitude $A_{max}$, which describes the reflection from a wall, is defined for the reflected ultrasonic signal. This applies to relatively short, medium and relatively long distances. It is assumed here, that the amplitude can occur with a value between 0 and $A_{max}$. In this case, $A_{max}$ is the even distribution between 0 and $A_{max}$.

The probability density function for the model of the amplitude of the interfering signal can be determined on the basis of real measurement data. The distance with reference to the ultrasonic sensor 4 can be divided here into a plurality of segments of the same length. Amplitude ranges of the same length can, furthermore, be determined for the amplitude. Measurement data of interfering signals can be recorded here, under the precondition that there is no object 8 in the surrounding region 9 of the motor vehicle 1. The number of echoes within each of the amplitude ranges can, furthermore, be counted. An empirical probability density function of the interfering signals, conditioned to the distance, results from this.

Figure 8:
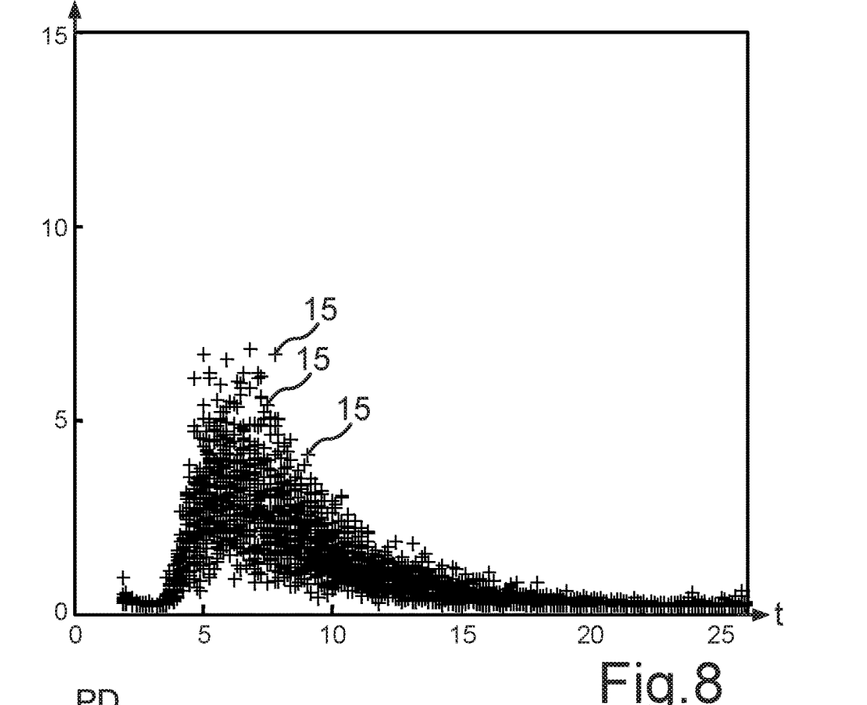
FIG. 8 shows different measurement points of a reference measurement which describes the amplitudes of raw signals depending on the transit time, wherein the raw signals originate from reflections of the ultrasonic signal at a gravel road.

An example of measurement points 15 that describe interfering signals is illustrated by way of example in FIG. 8. The transit time t is shown here on the abscissa, and the amplitude A is plotted on the ordinate. The measurement points 15 here describe the interfering signal that has been caused by reflections of the ultrasonic signal at a gravel road. It can be recognized here that the noise has the highest amplitude in a region with a transit time of 6 ms, which corresponds to about 1 m.

Figure 9:
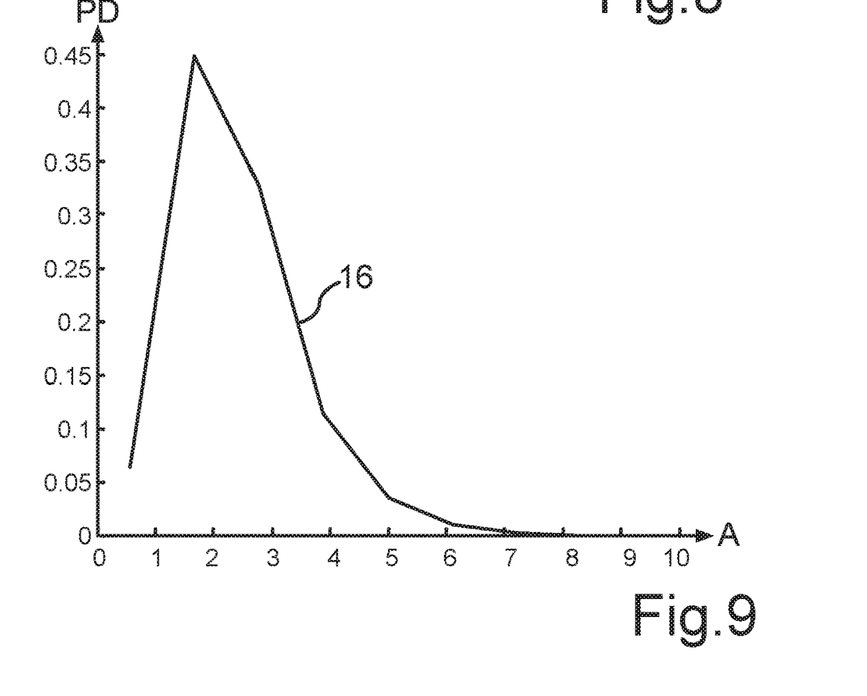
FIG. 9 shows a probability density of the measurement points according to FIG. 8 depending on the amplitude.

FIG. 9 shows a curve 16 for this purpose, which describes the probability density function for the measurement of FIG. 8. The amplitude A is shown here on the abscissa, and the probability density PD is plotted on the ordinate. It was ensured here that the same measurement data was not used for the parameter fitting and for the statistical test. It was furthermore possible to establish here that the intensity of the interfering signal differs markedly, depending on the ground. Marked differences between, for example, a gravel road and an asphalted road could be established.

In addition to this, a second echo can be received from the object 8. The second echo is modelled here as follows: The second echo occurs with a detection probability of $P_{D2}$, and the position of the second echo occurs, evenly distributed, at a distance of about 40 cm from the distance of the object 8. In order to avoid interferences between the first echo and the second echo, it is necessary that the PDAFAI is offered the possibility that the first echo is assigned to the object 8, and that a further echo is subsequently assigned as a second echo. The echoes are arranged with rising distance for this reason:

$$Z = \left\{ \begin{bmatrix} y_i \\ a_i \end{bmatrix} \right\}_{i=1}^{m} \quad (21)$$

$$\forall i, y_i < y_{i+1}$$

The set of all possible assignments takes the second echo into account as follows:

$$A = \{A_0, A_{ij}\}_{\substack{i=1\ldots m \\ j=i\ldots m}} \quad (22)$$

The state $A_{ij}$ here describes the echo i originating from the object 8, the echo j being a second echo, and the other echoes being interfering signals. The state $A_{ii}$, which is also referred to as $A_i$, is the state in which the echo i originates from the object 8 and the other echoes are interfering signals. $A_0$ describes the state in which all echoes are interfering signals and none of them originate from the object.

If $A_{ij}$ is true, $y_j$ is not used to update the Kalman filter. $y_j$ is only used if $A_{ii}$ is true, since the distance of the second echo does not supply any accurate information about the current position of the object. This yields:

$$\forall i \neq 0, \forall j \geq i, P(x/Z, A_{ij}) = P(x/Z, A_i) \quad (23)$$

With this, the mixed distribution from equation (1) yields:

$$P(x/Z) = \sum_{i=0}^{m} P(x/Z, A_i)\theta_i \quad (22)$$

$$\theta_0 = P(A_0/Z) = \beta_0 \quad (25)$$

$$\forall i > 0, \theta_i = \sum_{j=i}^{m} P(A_{ij}/Z) = \sum_{j=i}^{m} \beta_{ij}$$

It is therefore necessary to find an expression for $\theta_i$. Using Bayes' theorem, we obtain:

$$\beta_{ij} = \frac{1}{c} P(Z/A_{ij}, m) P(m/A_{ij}) P(A_{ij}) \quad (26)$$

Cases i=j and i=0 are identical to the standard PDAFAI. This takes into account that j≠i. Apart from $$z_i = \begin{bmatrix} y_i \\ a_i \end{bmatrix}$$

and $z_j$ it is assumed that the objects 8 are evenly distributed with respect to the interfering signals within V. This leads to the following factorization:

$$P(Z/A_{ij}, m) = P(z_i, z_j/A_{ij}) V^{-m+2} \prod_{\substack{k=1 \\ k \neq i,j}}^{m} P_0^\tau(a_k) \quad (27)$$

The definition of the qualified probability yields:

$$P(z_i, z_j/A_{ij}) = P(z_j/z_i, A_{ij}) P(z_i/A_{ij}) \quad (28)$$

From equation (24) we further obtain:

$$P(z_i/A_{ij}) = e_i P_1^\tau(a_i) \quad (29)$$

$P(z_j/z_i, A_{ij})$ is known from the previous assumptions. It is assumed here that $A_{ij}$ is true. This means that the second echo is arranged within V, the position of the second echo is evenly distributed between $z_i$ and the upper limit of V, which is limited to 40 cm. This corresponds to a segment with a length of $V_i$. $P_2^\tau$ should correspond here to the probability density function of the second echo. This leads to the following factorization:

$$P(Z/A_{ij}, m) = P_1^\tau(a_i) P_2^\tau(a_j) \prod_{\substack{k=1 \\ k \neq i,j}}^{m} P_0^\tau(a_k) e_i \varepsilon_{ij} V^{-m+2} \quad (30)$$

$$y_j > y_i + 40, \varepsilon_{ij} = 0$$

$$y_j \leq y_i + 40, \varepsilon_{ij} = V_i^{-1}$$

It is furthermore assumed that the number of false alarms follows a diffuse distribution. This yields:

$$P(m/A_{ij}) = P(m/A_i) = \Pi_0 \quad (31)$$

$\Pi_0$ will disappear from equation (27) within the normalization factor. An expression for $P(A_{ij})$ is also required. $P(\bigcup_{i=1}^{m} A_i)$ and $$P\left(\bigcup_{\substack{i=1\ldots m \\ j=i+1\ldots m}} A_{ij}\right)$$

can be determined for this purpose, and it can be assumed that all $A_i$ and $A_{ij}$ are equally probable.

Furthermore, $P_{D1}$ describes the probability for the detection of the object 8, and thus of the first echo. $P_{D2}$ describes the probability for the detection of the second echo. $P_1$ should be the probability that the first echo $\in V$ and the second echo $\notin V$. $P_2$ should be the probability that the first echo $\in V$ and the second echo $\in V$.

The following calculation can be derived from this:

$$P\left(\bigcup_{i=1}^{m} A_{ij}\right) = P_{D1}[P_G(1-P_{D2})+P_{D2}P_1] \tag{32}$$

$$P\left(\bigcup_{\substack{i=1\ldots m \\ j=i+1\ldots m}} A_{ij}\right) = P_{D1}P_{D2}P_2 \tag{33}$$

It is further assumed that $V=[a, b]$, and $S$ is the covariance of the innovation. The following calculation can be derived from this:

$$\text{if } b-a < 40, P_2 = \frac{b-\hat{x}}{40}P_G \text{ otherwise} \tag{34}$$

$$P_2 = \int_a^{b-40} N(y_1, \hat{x}, S)dy_1 + F(b) - F(b-40)$$

$$F(y_1) = \frac{b-\hat{x}}{40}\frac{1}{2}\text{erf}\left(\frac{y_1-\hat{x}}{\sqrt{2S}}\right) + \frac{S}{40}N(y_1,\hat{x},S) \tag{35}$$

$$P_1 + P_2 = P_G$$

In accordance with the previous assumption of equal probabilities, we obtain:

$$\forall i > 0, P(A_i) = \frac{P\left(\bigcup_{i=1}^{m} A_{ij}\right)}{m} \tag{36}$$

$$= \frac{P_{D1}[P_G(1-P_{D2})+P_{D2}P_1]}{m}$$

$$\forall i > 0, i > j, P(A_{ij}) = \frac{P\left(\bigcup_{\substack{i=1\ldots m \\ j=i+1\ldots m}} A_{ij}\right)}{\sum_{j=i}^{m}(m-i)} \tag{37}$$

$$= \frac{P_{D1}P_{D2}P_2}{m^2 - \frac{m(m+1)}{2}}$$

$$= \frac{2P_{D1}P_{D2}P_2}{m(m-1)}$$

$$P(A_0) = 1 - P\left(\bigcup_{i=1}^{m} A_i\right) - P\left(\bigcup_{\substack{i=1\ldots m \\ j=i+1\ldots m}} A_{ij}\right) \tag{38}$$

$$= 1 - P_{D1}P_G$$

Altogether then, we obtain from equations (31), (32), (37), (38) and (39) in equation (27):

$$\forall i > 0, i > j, \beta_{ij} = \frac{2V^2\gamma_i\gamma'_j e_i \varepsilon_{ij} P_{D1}P_{D2}P_2}{\Gamma_0} \tag{39}$$

$$\forall i > 0, \beta_i = \frac{(m-1)\gamma_i e_i V P_{D1}[P_G(1-P_{D2})+P_{D2}P_1]}{\Gamma_0} \tag{40}$$

$$\beta_0 = \frac{m(m-1)(1-P_{D1}P_G)}{\Gamma_0} \tag{41}$$

$$\gamma'_j = \frac{P_2^\tau(a_i)}{P_0^\tau(a_i)} \tag{42}$$

$\Gamma_0$ is a normalization factor here, so that all the weightings add up to the value 1. It should be noted that the PDAFAI with the second echo reduces to the standard PDAFAI if $P_{D2}=0$.

The PDAFAI is, additionally, combined with an IMM (Interactive Multiple Model). Multiple models or hypotheses can be combined together with the aid of the IMM. A model for a constant speed, as well as a second model for a high acceleration, are used here. A third model where $P_{D1}=0$ is also used, in order to describe the case in which the object is no longer present. The following Markov transition matrix is used here:

$$\begin{bmatrix} 0.85 & 0.1 & 0.05 \\ 0.45 & 0.5 & 0.05 \\ 0.25 & 0.25 & 0.5 \end{bmatrix}$$

In order to be able to distinguish between the interfering signals of an asphalted surface and a gravel road, the IMM could also be extended with three additional models. The first three models would then be used for the probability density function of the asphalt, and the last three models for the probability density function of the gravel road. This would, however, double the number of models, and thus significantly increase the running time.

A method that places less demand on the resources would consist in making a hard decision at every step as to whether asphalt or gravel is present. This hard decision can be carried out on the basis of a Bayesian approach, identical to what is done within the IMM. In the present case, however, the model with the highest probability is selected. In practice the classification into asphalt or gravel is very robust. It has been found here, that the probability of selecting the correct model is very close to 1.

Only the echoes that are originate from the ground are used to determine the probability. Since the ultrasonic sensor 4 cannot see through objects 8, and therefore cannot detect the ground behind an object 8, echoes that are located behind a tracked object 8 are not used for the calculation of the probability. If the object 8 is detected at a distance of more than 1 m, the model probabilities are not updated, since too little information about the ground is available to the ultrasonic sensor 4.

The model probabilities are initialized with a value of 0.5, and the following Markov transitions are used:

$$\begin{bmatrix} 0.99 & 0.01 \\ 0.01 & 0.99 \end{bmatrix}$$

Here $\lambda_k^j$ describes the probability of the measurement of a model j at time step k. The measurements here, independently of one another, determine:

$$\lambda_k^j = \prod_{i=1}^{m} P_0^j(a_i/y_i)P(y_i) \quad (43)$$

All the $P(y_i)$ are equally probable here. The probability can thus be simplified as follows:

$$\lambda_k^j = \prod_{i=1}^{m} P_0^j(a_i/y_i) \quad (44)$$

In the present case, the second echo, which originates from the object 8, is considered separately in the PDAF. This is referred to below as PDAF with second echo.

The way in which the individually tracked objects 8, or the tracks, are treated is explained below. A new track is created as soon as an echo that cannot be assigned to any existing track is above the ground threshold value curve. A check is also made as to whether this track does not have a spacing of about 40 cm from an existing track. The variance related to the position is determined depending on the spacing measurement with the ultrasonic sensor 4, and the relative speed is set to the maximum possible value. It can furthermore be provided that a track is removed if the probability of the non-existence of the IMM falls below a predetermined threshold value which can, for example, be 70%. It can also be the case that two tracks are merged if the test related to the Mahalanobis distance is true. The fact that the Mahalanobis distance between two tracks is $\chi^2$-distributed with two degrees of freedom can be taken into account here.

Figure 10:
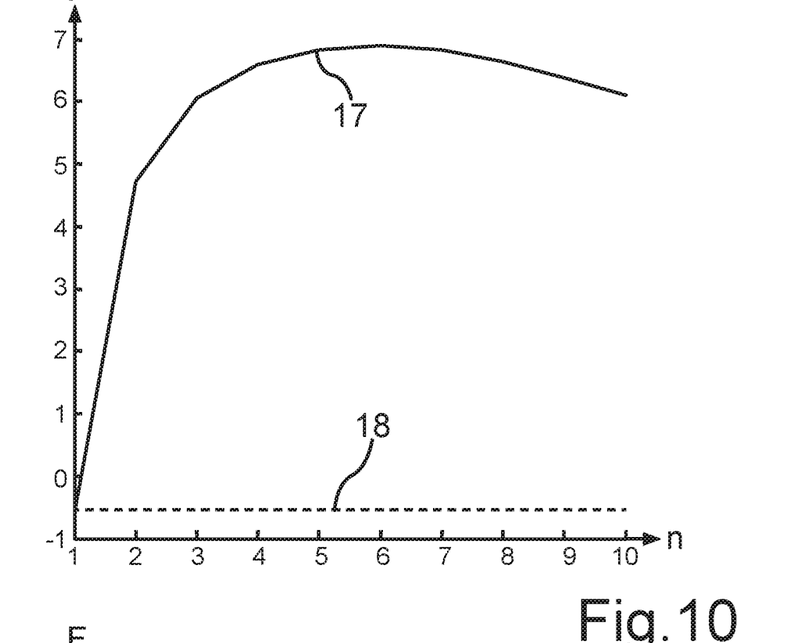
FIG. 10 shows tracking errors when tracking an object from which a second echo is received.

Overall, the filter can on the one hand be used to output the tracked position on the basis of the measurements with the ultrasonic sensor 4. On the other hand, the filter can be used to determine the signal peaks 13 out of the raw signal 10 of the ultrasonic sensor 4 that are to be assigned to the object 8. The functional capacity of the filter used is illustrated below. At first, the advantage of the PDAF with the second echo is shown on the basis of a simulated example. A static object that outputs a constant echo 10 cm behind the first echo is simulated here. In this case, the tracking errors for a normal PDAF and for the PDAF with the second echo have been calculated. The tracking errors describe the spatial deviation when tracking the object 8. In this respect, the diagram in FIG. 10 plots the number of the steps n on the abscissa, and the error F on the ordinate in centimetres. The curve 17 on the diagram describes the tracking error that was achieved with the normal PDAF. In comparison with this, the curve 18 shows the tracking error that was achieved with the PDAF with the second echo. The second echo cannot be tracked accurately in the present case with the normal PDAF. The PDAF with the second echo demonstrates the expected behaviour, namely that it converges on the position of the first echo. A further advantage is that the PDAF with the second echo always returns the first echo as the most probable assignment to the track, whereas the normal PDAF returns the second echo as the most probable assignment.

Figure 11:
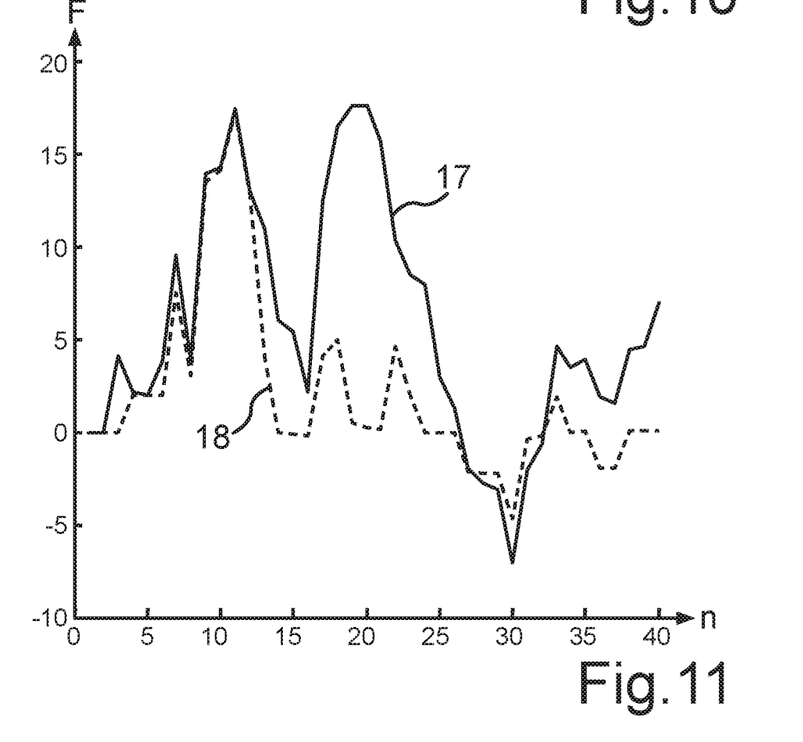
FIG. 11 shows tracking errors when tracking a pedestrian dummy from which a plurality of echoes are received.

In addition to this, measurements were carried out with a dummy pedestrian. This dummy pedestrian reflects numerous echoes that can, for example, originate from the torso, the legs and/or the arms. Up to five echoes of the ultrasonic signal can occur here. FIG. 11 illustrates the tracking error for the normal PDAF (curve 17) and the PDAF with the second echo (curve 18) for this measurement. It can be recognized here that the error of the PDAF with the second echo is significantly lower than the error of the normal PDAF. It can also be seen that the tracking error always rises in the region of the tenth step. It must be assumed here that an echo that is caused by a part of the object 8 or of the dummy pedestrian is hard to detect, and is thus not detected at a greater distance. The filter here requires a few steps to adjust itself to the distance. Tracking errors with the normal PDAF are, furthermore, a result of the fact that a plurality of reflections of the object 8 are received.

As explained above, it is provided that the type of the ground is classified. Various trials were carried out for this purpose, and are represented in the following table.

| Case | Minimum probability for asphalt | Minimum probability for gravel |
|---|---|---|
| Dummy pedestrian getting closer on asphalt | 0.961 | — |
| Small dummy pedestrian getting closer on asphalt | 0.979 | — |
| Garbage bin getting closer on asphalt | 0.903 | — |
| Standard 75 mm post getting closer on asphalt | 0.949 | — |
| Driving over gravel | — | 0.999 |
| Garbage bin getting closer on gravel | — | 0.988 |
| Standard 75 mm post getting closer on gravel | — | 0.990 |

It can be seen that the detection of the ground type delivers very good results. In practice, the surface in the surrounding region 9 of the motor vehicle 1 was recognized with a probability of more than 99% for almost all steps. The idea that it is not necessary to take the IMM into account when detecting the type of ground was thus confirmed. Computing capacity and time can thus be saved.

The following table describes different cases in order to clarify the detection rate of the PDAF with the second echo.

| Case | Detection rate for PDAF with second echo | Detection rate for comparison with ground threshold value curve |
|---|---|---|
| Dummy pedestrian getting closer on asphalt | 100% | 92.5% |
| Small dummy pedestrian getting closer on asphalt | 100% | 65% |
| Garbage bin getting closer on asphalt | 100% | 58% |
| Standard 75 mm post getting closer on asphalt | 98% | 62% |
| Garbage bin getting closer on gravel | 98.9% | 77.5% |
| Standard 75 mm post getting closer on gravel | 100% | 68.5% |

The PDAF with the second echo here counts a valid object detection if a proportion of the raw signal is detected as the most probable assignment, or if the signal peak exceeds the ground threshold value curve 11. When using the ground threshold value curve 11, a valid object detection is then counted if a signal peak 13 exceeds the ground threshold value curve 11.

The advantage of tracking the object 8 on the basis of the raw signal 10 making use of the PDAF with the second echo entails significant advantages. The use of the ground threshold value curve 11 alone entails a significantly lower detection rate. On the one hand this is due to the fact that the amplitude of the signal peaks 13 in the raw signal 10 can show variations at relatively large distances, and the signal peaks can thus occur both above and below the ground threshold value curve 11. At relatively small distances, the amplitude of the ground threshold value curve 11 is selected to be relatively high, in order to suppress ground reflections from gravel. Echoes from weakly reflecting objects 8 are not detected here.

The invention claimed is:

1. A method for detecting an object in a surrounding region of a motor vehicle, comprising:
   in each of a plurality of temporally sequential measurement cycles, receiving a raw signal that describes an ultrasonic signal of an ultrasonic sensor reflected from the object in the surrounding region;
   comparing the raw signal with a predetermined ground threshold value curve;
   detecting a signal component of the raw signal which exceeds the ground threshold value curve and assigning the signal component to the object; and
   tracking the object in the measurement cycles on the basis of the detected signal component,
   wherein to track the object after recognition of the signal component, in the subsequent measurement cycles, signal peaks of the raw signal are detected, and an assignment of the detected signal peaks to the object is checked,
   wherein for each signal peak, a first probability is determined that said each signal peak describes a reflection of the ultrasonic signal at the object, and a second probability is determined that said each signal peak describes an interfering signal, and
   wherein assignment of said each signal peak to the object is carried out with reference to the first probability and to the second probability.

2. The method according to claim 1, wherein to recognize the signal peaks, regions of the raw signal that exceed a predetermined noise threshold value curve and which exhibit a predetermined rise are determined independently of the predetermined ground threshold value curve.

3. The method according to claim 1, wherein a movement model that describes a movement of the object relative to the motor vehicle is determined, and the first probability is determined depending on the movement model.

4. The method according to claim 1, wherein respective amplitudes of the signal peaks are determined, and the first probability and the second probability are determined depending on the respective amplitudes.

5. The method according to claim 1, wherein the first probability is determined with reference to at least one predetermined probability density function for amplitudes of raw signals that describe reflections of ultrasonic signals at objects.

6. The method according to claim 1, wherein the second probability is determined with reference to at least one predetermined probability density function for amplitudes of raw signals that describe reflections of ultrasonic signals at a ground in the surrounding region.

7. The method according to claim 6, wherein for predetermined distances, the at least one probability density function is predetermined in each case, for said each signal peak a distance assigned to said each signal peak is determined, and the second probability for said each signal peak is determined with reference to the probability density function for the distance.

8. The method according to claim 6, wherein for an asphalted roadway and a gravel road, the at least one probability density function is predetermined in each case, and the second probability is determined depending on the type of the ground in the surrounding region.

9. The method according to claim 8, wherein the type of the ground in the surrounding region is determined in each measurement cycle on the basis of an assignment of the raw signal received to one of the at least one predetermined probability density function.

10. The method according to claim 1, wherein a check is made as to whether one of the signal peaks originates from a second echo of the ultrasonic signal reflected by the object, and when said one of the signal peaks describes the second echo, said one of the signal peaks is tracked as a second echo.

11. The method according to claim 10, wherein said one of the signal peaks is recognized as originating from the second echo when a distance that describes said one of the signal peaks has a predetermined spacing from a distance of the object.

12. A control device for a motor vehicle, the control device being configured to perform the method according to claim 1.

13. An ultrasonic sensor apparatus for a motor vehicle comprising the control device according to claim 12; and the ultrasonic sensor.

* * * * *